United States Patent
Dai et al.

(10) Patent No.: US 10,843,926 B2
(45) Date of Patent: Nov. 24, 2020

(54) 2-MERCAPTOBENZOTHIAZOLE MODIFIED GRAPHENE OXIDE ANTI-CORROSION COATING AND METHOD FOR PREPARATION THEREOF

(71) Applicant: XIAMEN UNIVERSITY, Xiamen, Fujian (CN)

(72) Inventors: Lizong Dai, Xiamen (CN); Shicheng Wang, Xiamen (CN); Zhiheng Shao, Xiamen (CN); Ting Chen, Xiamen (CN); Conghui Yuan, Xiamen (CN); Birong Zeng, Xiamen (CN); Yiting Xu, Xiamen (CN); Wei'ang Luo, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 21 days.

(21) Appl. No.: 16/463,771

(22) PCT Filed: Nov. 23, 2017

(86) PCT No.: PCT/CN2017/112586
§ 371 (c)(1),
(2) Date: May 23, 2019

(87) PCT Pub. No.: WO2018/095364
PCT Pub. Date: May 31, 2018

(65) Prior Publication Data
US 2019/0276318 A1    Sep. 12, 2019

(30) Foreign Application Priority Data

Nov. 23, 2016 (CN) .......................... 2016 1 1036205

(51) Int. Cl.
*C01B 32/194* (2017.01)
*C08K 3/04* (2006.01)
(Continued)

(52) U.S. Cl.
CPC .......... *C01B 32/194* (2017.08); *C01B 32/198* (2017.08); *C08K 3/04* (2013.01);
(Continued)

(58) Field of Classification Search
CPC . C08K 3/04; C08K 3/042; C08K 5/37; C08K 5/375; C08K 5/378; C08K 5/57;
(Continued)

(56) References Cited

FOREIGN PATENT DOCUMENTS

| CN | 1221768 A | 7/1999 |
|---|---|---|
| CN | 101108947 A | 1/2008 |

(Continued)

OTHER PUBLICATIONS

Partial machine translation of CN105255353 A (2016).*

*Primary Examiner* — Kregg T Brooks
(74) *Attorney, Agent, or Firm* — Cooper Legal Group, LLC

(57) ABSTRACT

Provided are a 2-mercaptobenzothiazole modified graphene oxide anti-corrosion coating and a preparation method thereof, the raw materials of which comprising, by mass ratio: 2-mercaptobenzothiazole modified graphene oxide 5-20; a matrix resin 30-70; a leveling agent 0.5-1.0; a defoamant 0.5-1.0; a dispersant 0.5-1.0; a film-forming additive 0.5-1.0; a diluent 20-35. The method for the 2-mercaptobenzothiazole modified graphene oxide comprises first reacting graphene oxide with cyanuric chloride, then reacting with 2-mercaptobenzothiazole.

8 Claims, 2 Drawing Sheets

(51) Int. Cl.
- *C09D 7/63* (2018.01)
- *C09D 7/62* (2018.01)
- *C08K 9/04* (2006.01)
- *C09D 5/08* (2006.01)
- *C09D 163/00* (2006.01)
- *C09D 167/00* (2006.01)
- *C09D 175/04* (2006.01)
- *C09D 133/00* (2006.01)
- *C09D 161/20* (2006.01)
- *C09D 127/12* (2006.01)
- *C09D 167/08* (2006.01)
- *C08K 5/375* (2006.01)
- *C08K 5/378* (2006.01)
- *C01B 32/198* (2017.01)

(52) U.S. Cl.
CPC .............. *C08K 3/042* (2017.05); *C08K 5/375* (2013.01); *C08K 5/378* (2013.01); *C08K 9/04* (2013.01); *C09D 5/08* (2013.01); *C09D 7/62* (2018.01); *C09D 7/63* (2018.01); *C09D 127/12* (2013.01); *C09D 133/00* (2013.01); *C09D 161/20* (2013.01); *C09D 163/00* (2013.01); *C09D 167/00* (2013.01); *C09D 167/08* (2013.01); *C09D 175/04* (2013.01); *C01P 2002/20* (2013.01); *C01P 2002/72* (2013.01); *C01P 2002/82* (2013.01); *C01P 2004/03* (2013.01)

(58) Field of Classification Search
CPC ....... C08K 9/04; C01B 32/194; C01B 32/198; C09D 5/08; C09D 127/12–20; C09D 133/00–16; C09D 161/20–32; C09D 163/00–10; C09D 167/00–08; C09D 175/04–14; C09D 7/62
See application file for complete search history.

(56) References Cited

FOREIGN PATENT DOCUMENTS

| | | | |
|---|---|---|---|
| CN | 102604533 A | | 7/2012 |
| CN | 102978625 A | | 3/2013 |
| CN | 104419228 A | | 3/2015 |
| CN | 104629603 A | | 5/2015 |
| CN | 105255353 A | * | 1/2016 |
| CN | 105482533 A | | 4/2016 |
| CN | 105820645 A | | 8/2016 |
| CN | 106700823 A | | 5/2017 |

* cited by examiner

2-MERCAPTOBENZOTHIAZOLE MODIFIED GRAPHENE OXIDE ANTI-CORROSION COATING AND METHOD FOR PREPARATION THEREOF

TECHNICAL FIELD

The invention relates to an anti-corrosion coating, in particular to a 2-mercaptobenzothiazole modified graphene oxide composite anti-corrosion coating and a preparation method thereof.

BACKGROUND ART

Metal corrosion is widespread, causing serious losses to the national economy. Over the years, various technologies and methods have been developed to solve the problem. As one of the common means of anti-corrosion, surface coating protection has become the major anti-corrosion because of its simple construction, convenient maintenance, wide adaptability and low cost.

Graphene is a novel two-dimensional material, and its many excellent physical and chemical properties have attracted wide attention. Compared with graphene, graphene oxide has more oxygen-containing organic functional groups on the surface. These oxygen-containing organic functional groups can make it have excellent compatibility and joint surface structure with some organic resins such as epoxy resin. The role of graphene oxide as a reinforcing phase in the continuous phase resin is fully exploited, and the strong hydrophilicity exhibited by these oxygen-containing functional groups allows the graphene oxide to be stably dispersed in some solvents. 2-mercaptobenzothiazole is a special corrosion inhibitor. It has been found that atoms with larger electronegativity such as nitrogen, oxygen and sulfur can satisfy the needs for electrons in metal vacant orbits. Most of the compounds containing these atoms are efficient corrosion inhibitors for carbon steel. These characteristics enable graphene oxide and 2-mercaptobenzothiazole to be used in coatings.

In order to improve the anti-corrosion coating process and reduce pollution, there is therefore a need for novel doped coating is needed. The patent (CN 101108947 A, CN 1221768 A) has introduced coatings with inorganic fillers as fillers. These coatings need to add a large amount of inorganic conductive fillers, and the inorganic fillers have poor compatibility with the resin, which makes the mechanical properties of the paint film decrease. The patent (CN 102604533 A) introduced the anti-corrosion coatings based on polyaniline and graphene composites. The invention believed that graphene was beneficial to improve the physical anti-corrosion performance of the paint film, but it was easy to agglomerate and disperse unstably in the dispersion process. The patent (CN 102978625 A) introduces a 2-mercaptobenzothiazole corrosion inhibitor, but it is just simply physically mixed with the matrix resin, and the degree of dispersion is difficult to guarantee.

SUMMARY OF THE INVENTION

The aim of this invention is to provide a modified graphene oxide anti-corrosion coating and a preparation method by combining the characteristics of 2-mercaptobenzothiazole and graphene oxide, which have both corrosion inhibition and physical barrier property.

The modified graphene oxide anti-corrosion coating, by mass ratio comprising:

| | |
|---|---|
| 2-mercaptobenzothiazole modified graphene oxide | 5-20 parts |
| matrix resin | 30-70 parts |
| leveling agent | 0.5-1.0 parts |
| defoamant | 0.5-1.0 parts |
| dispersant | 0.5-1.0 parts |
| film-forming additive | 0.5-1.0 parts |
| diluent | 20-35 parts |

The 2-mercaptobenzothiazole modified graphene oxide is synthesized by graphene oxide, cyanuric chloride and 2-mercaptobenzothiazole.

The matrix resin can be selected from one of epoxy resin, fluorocarbon resin, amino resin, acrylic resin, polyurethane resin, alkyd resin, polyester resin, etc.

The leveling agent can be selected from one of organosilicon, acrylic acid and monobutyl ether.

The defoamant can be selected from one of the organosilicon defoamant, inorganic silicon defoamant and non-organosilicon defoamant, such as BYK302, BYK065, BYK20, BYK011, BYK053 produced by Germany BYK Company, or Efka 2018 produced by Efka Company.

The dispersant can be self-fluxing dispersant or wetting dispersant, such as BYK101, BYK161, BYK163 produced by Germany BYK Company, or Efka5044 produced by Efka Company.

The film-forming additive can be selected from one of butyl benzyl alcohol acetate, ethylene glycol butyl ether alkyd ester, ethylene glycol phenyl ether, dibasic acid dimethyl esters, propylene glycol propyl ether, dibasic acid diethyl ester, etc.

The diluent can be selected from at least one of 1, 4-butanediol diglycidyl ether, ethylene glycol diglycidyl ether, acetone, xylene, n-butanol, methyl isobutyl ketone, absolute ethanol, ethyl acetate, butyl acetate, etc.

The 2-mercaptobenzothiazole modified graphene oxide has a structure such as (I)

(I)

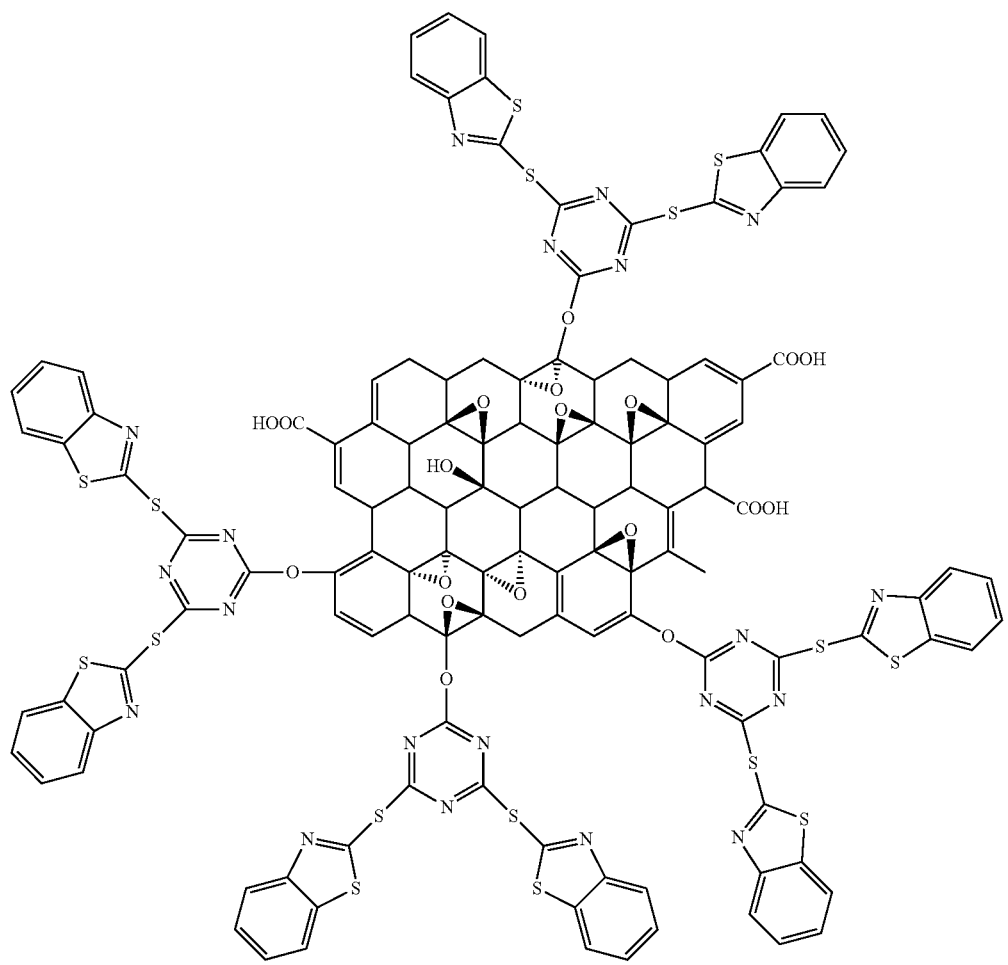

The preparation method of 2-mercaptobenzothiazole modified graphene oxide is as follows:

Step 1: a certain amount of graphene oxide, cyanuric chloride and sodium bicarbonate are taken into a flask, a certain volume of N, N-dimethylformamide is taken to disperse it, stirred for 0.5-4 hours at room temperature, heated to 50° C. and stirred for 10-24 hours, then cooled and filtered to obtain the precipitation. Wherein graphene oxide, cyanuric chloride and sodium bicarbonate are graphene oxide:cyanuric chloride:sodium bicarbonate=1-30 g:1-8 mol:1-20 mol according to the feed ratio, and the volume of N, N-dimethylformamide is 100-2000 ml.

Step 2: The precipitation in step 1, 2-mercaptobenzothiazole and potassium hydroxide are taken into a flask, a certain amount of acetone is taken to disperse them and react for 6-10 hours, cooled and filtered. Wherein the precipitation, 2-mercaptobenzothiazole and potassium hydroxide are precipitation:2-mercaptobenzothiazole:potassium hydroxide=1~30 g:1~8 mol:1~8 mol according to the feed ratio, the volume of acetone is 100-2000 ml.

The synthetic route of 2-mercaptobenzothiazole modified graphene oxide is as follows:

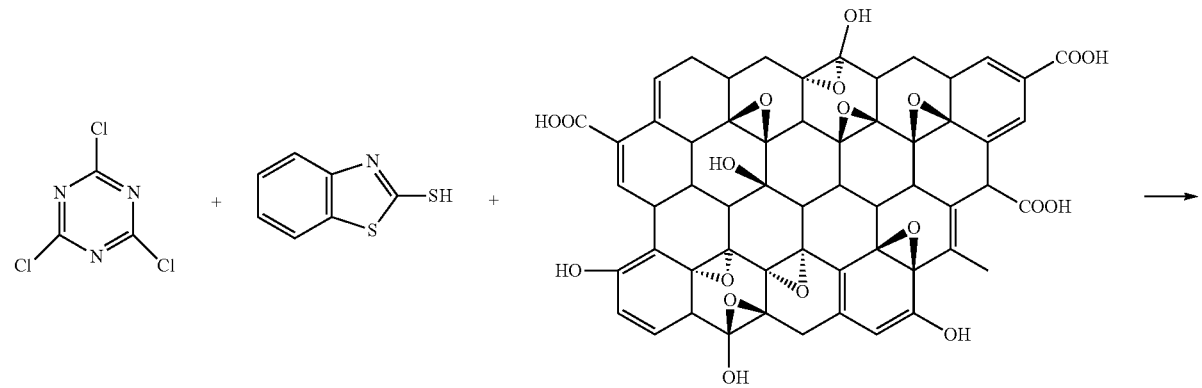

-continued

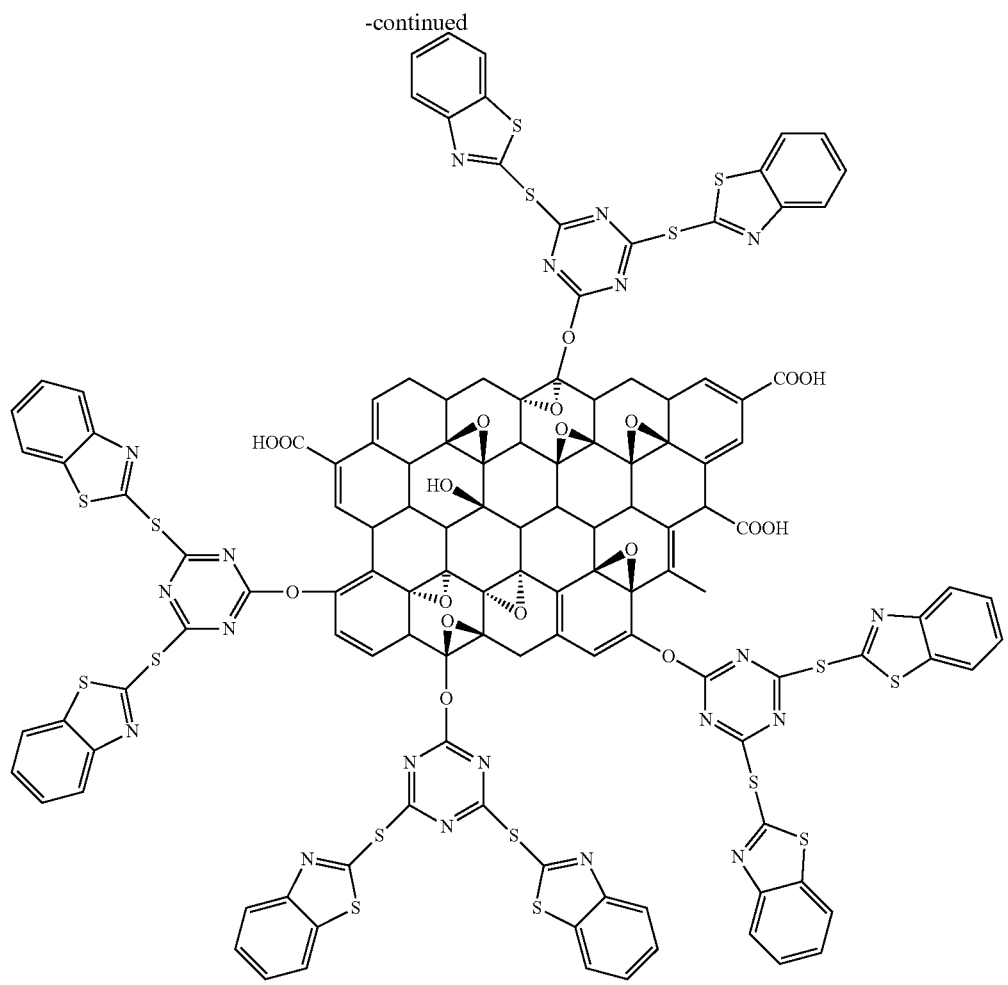

The preparation method of 2-mercaptobenzothiazole modified graphene oxide composite anti-corrosion coating:

After dispersing and mixing the components for 1 to 4 hours, 2-mercaptobenzothiazole modified graphene oxide composite anti-corrosion coating is obtained after filtration.

Firstly, a 2-mercaptobenzothiazole modified graphene oxide is prepared. According to the anti-corrosion coating component ratio, 5-20 parts of modified graphene oxide, 30-70 parts of matrix resin, 0.5-1.0 parts of leveling agent, 0.5-1.0 parts of defoamant, 0.5-1.0 parts of dispersant, 0.5-1.0 parts of film-forming additive and 20-35 parts of diluent are taken, disperse evenly by the disperser and filtered to obtain the anti-corrosion coating.

On the basis of molecular design, 2-mercaptobenzothiazole is grafted onto the surface of graphene oxide through surface functional groups of graphene oxide. The synthesized material has both the physical barrier property of graphene oxide and the corrosion inhibition of 2-mercaptobenzothiazole. At the same time, the oxygen-containing functional groups on the surface of graphene oxide can make it have excellent compatibility and joint surface structure with epoxy resin and other organic resins. As a filler, its dispersion in epoxy resin is improved, and the corrosion resistance is improved obviously. At the same time, the addition of graphene oxide can effectively improve the mechanical properties of anti-corrosion coating.

DRAWINGS

DETAILED DESCRIPTION

The contents of the present invention are described in detail below with embodiments.

Embodiment 1

(1) Preparation of 2-Mercaptobenzothiazole Modified Graphene Oxide

A. 10 g of graphene oxide, 2 mol of cyanuric chloride and 6 mol of sodium bicarbonate were taken to disperse in 1000 ml of N, N-dimethylformamide, and filled it with nitrogen for protection, stirred for 2 hours at room temperature, heated to 50° C., stirred for 22 hours. After the reaction, precipitation was obtained by washing 5 times with N, N-dimethylformamide, washing 2 times with water and drying for 24 hours in vacuum.

Figure 1:
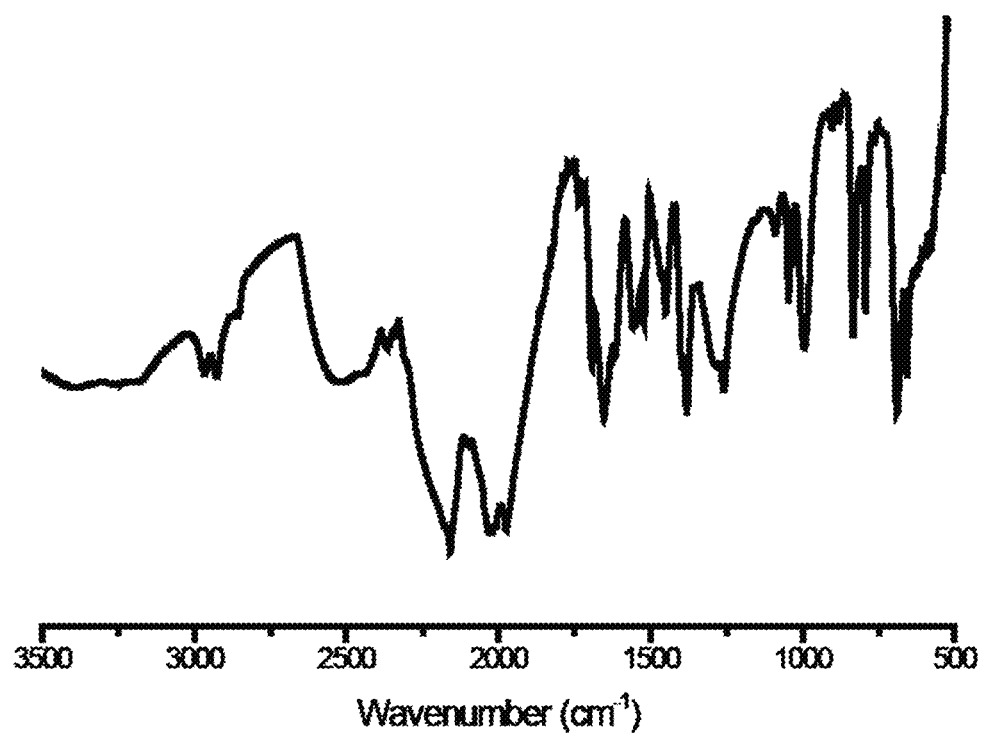
FIG. 1 shows the infrared spectra of 2-mercaptobenzothiazole modified graphene oxide in embodiment 1.
Figure 2:
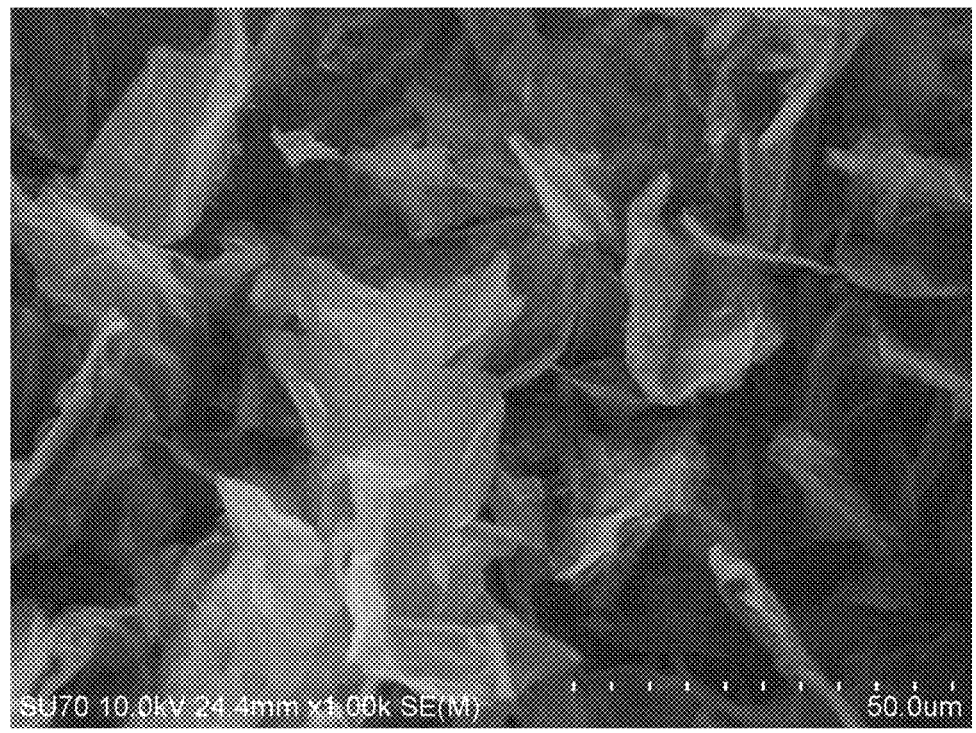
FIG. 2 is a scanning electron micrograph of 2-mercaptobenzothiazole modified graphene oxide in embodiment 1.
Figure 3:
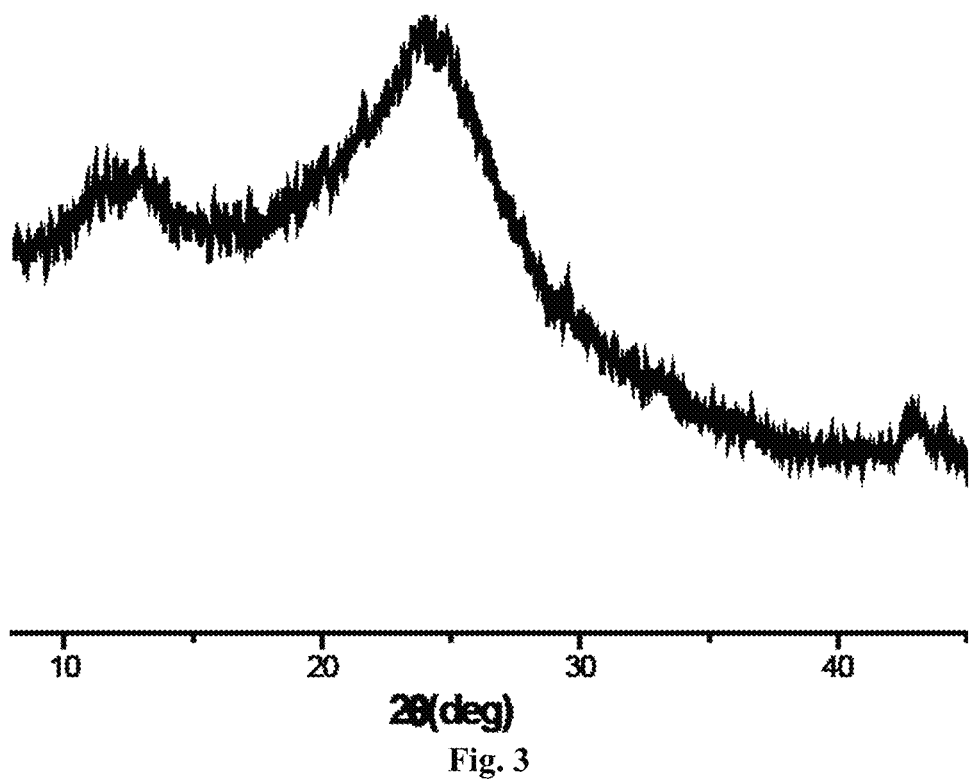
FIG. 3 is XRD spectra of 2-mercaptobenzothiazole modified graphene oxide in embodiment 1.

B. 10 g of precipitation in A was taken, 2 mol of 2-mercaptobenzothiazole and 2 mol of potassium hydroxide were dispersed in 1000 ml of acetone, and filled it with nitrogen for protection, and stirred at 45° C. for 8 h, after the reaction was finished, the precipitation was obtained by washing with acetone five times, washing with water twice and drying in vacuum for 24 hours. The infrared spectra of 2-mercaptobenzothiazole modified graphene oxide were shown in FIG. 1, corresponding to the characteristic peaks of functional groups. Scanning electron micrograph (SEM) was shown in FIG. 2, there are obvious folds in the lamellae. The XRD spectra of the 2-mercaptobenzothiazole modified graphene oxide were shown in FIG. 3. The peak of graphene oxide is obviously weakened and characteristic peak of graphitization appears after the modified graphene oxide.

(2) Preparation of 2-Mercaptobenzothiazole Modified Graphene Oxide Composite Anti-Corrosion Coating 5 parts of modified graphene oxide, 30 parts of epoxy resin, 0.5 parts of organosilicon, 0.5 parts of defoamant BYK302, 0.5 parts of dispersant BYK101, 0.5 parts of ethylene glycol phenyl ether and 20 parts of 1,4-butanediol glycidyl ether were mixed and dispersed evenly by the disperser for 4 hours. After filtration, 2-mercaptobenzothiazole modified graphene oxide composite anti-corrosion coating was obtained. Its anticorrosive properties were shown in Table 1.

Embodiment 2

(1) Preparation of 2-Mercaptobenzothiazole Modified Graphene Oxide

A. 20 g of graphene oxide, 4 mol of cyanuric chloride and 12 mol of sodium bicarbonate were dispersed in 1500 ml of N, N-dimethylformamide, and filled it with nitrogen for protection, stirred for 3 hours at room temperature, heated to 50° C., and stirred for 24 hours. After the reaction, the precipitation was obtained by washing 5 times with N, N-dimethylformamide, washing twice with water and drying for 24 hours in vacuum.

B. 20 g of precipitation in A was taken, 4 mol of 2-mercaptobenzothiazole and 4 mol of potassium hydroxide were dispersed in 1500 ml of acetone, and filled it with nitrogen for protection, and stirred at 45° C. for 10 h, after the reaction was finished, the precipitation was obtained by washing with acetone five times, washing with water twice and drying in vacuum for 24 hours.

(2) Preparation of 2-Mercaptobenzothiazole Modified Graphene Oxide Composite Anti-Corrosion Coating 10 parts of modified graphene oxide, 50 parts of epoxy resin, 0.8 parts of organosilicon, 0.6 parts of defoamant BYK302, 0.6 parts of dispersant BYK101, 0.8 parts of ethylene glycol phenyl ether and 30 parts of 1,4-butanediol glycidyl ether were mixed and dispersed evenly by the disperser for 4 hours. After filtration, 2-mertozobenthiazole modified graphene oxide composite anti-corrosion coating was obtained. Its anticorrosive properties were shown in Table 1.

Embodiment 3

(1) Preparation of 2-Mercaptobenzothiazole Modified Graphene Oxide

A. 30 g of graphene oxide, 6 mol of cyanuric chloride and 18 mol of sodium bicarbonate were dispersed in 2000 ml of N, N-dimethylformamide, and filled it with nitrogen for protection, stirred for 4 hours at room temperature, heated to 50° C., and stirred for 24 hours. After the reaction, the precipitation was obtained by washing 5 times with N, N-dimethylformamide, washing 2 times with water and drying for 24 hours in vacuum.

B. 30 g of precipitation in A was taken, 6 mol of 2-mercaptobenzothiazole and 6 mol of potassium hydroxide were dispersed in 2000 ml of acetone, and filled it with nitrogen for protection, and stirred at 50° C. for 10 h, after the reaction was finished, the precipitation was obtained by washing with acetone five times, washing with water twice and drying in vacuum for 24 hours.

(2) Preparation of 2-Mercaptobenzothiazole Modified Graphene Oxide Composite Anti-Corrosion Coating 20 parts of modified graphene oxide, 70 parts of acrylic resin, 0.8 parts of organosilicon, 1 parts of defoamant BYK302, 1 parts of dispersant BYK101, 0.8 parts of ethylene glycol phenyl ether and 20 parts of ethyl acetate were mixed and dispersed evenly by disperser for 4 hours. After filtration, 2-mercaptobenzothiazole modified graphene oxide composite anti-corrosion coating was obtained. Its anticorrosive properties were shown in Table 1.

TABLE 1

| The corrosion test of anti-corrosion coating in embodiments 1 to 3 | | | | |
| --- | --- | --- | --- | --- |
| Index name | Embodiment 1 | Embodiment 2 | Embodiment 3 | Test method |
| acid resistance (5% $H_2SO_4$, 25° C.) | | paint film does not foam and rust for 700 h | | GB/T 9274 |
| alkali resistance (3% NaOH, 25° C.) | | paint film does not foam and rust for 900 h | | GB/T 9274 |
| salt solution resistance (3% NaCl, 25° C.) | | paint film does not foam and rust for 1000 h | | GB/T 1763 |
| salt spray resistance | | paint film does not foam and rust for 1000 h | | GB/T 1771 |

As mentioned above, these are only preferred embodiments of the present invention, so the scope of implementation of the present invention cannot be limited accordingly. That is, the equivalent changes and modifications made according to the patent scope and description content of the present invention should still be within the scope of the present invention.

The invention claimed is:

1. A method for preparing 2-mercaptobenzothiazole modified graphene oxide, wherein:
   step 1: a certain amount of graphene oxide, cyanuric chloride and sodium bicarbonate are taken into a flask, a certain volume of N, N-dimethylformamide is taken to disperse it, stirred for 0.5-4 hours at room temperature, heated to 50° C. and stirred for 10-24 hours, then cooled and filtered to obtain the precipitation; wherein graphene oxide, cyanuric chloride and sodium bicarbonate are graphene oxide:cyanuric chloride:sodium bicarbonate=1-30 g:1-8 mol:1-20 mol according to the feed ratio, and the volume of N, N-dimethylformamide is 100-2000 ml;

step 2: the precipitation in step 1, 2-mercaptobenzothiazole and potassium hydroxide are taken into a flask, a certain volume amount of acetone is taken to disperse them and react for 6-10 hours, cooled and filtered and

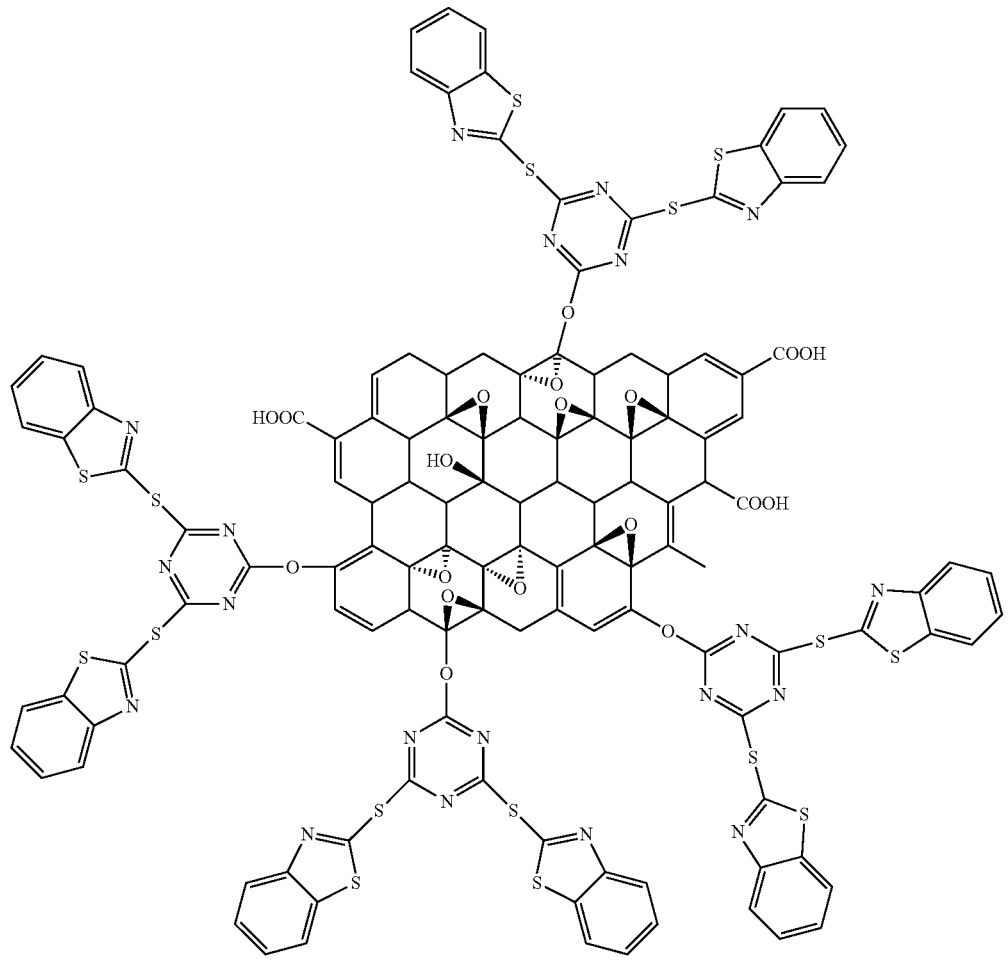

is obtained; wherein the precipitation, 2-mercaptobenzothiazole and potassium hydroxide are precipitation:2-mercaptobenzothiazole:potassium hydroxide=1~30 g:1~8 mol:1~8 mol according to the feed ratio, the volume of acetone is 100-2000 ml.

2. A 2-mercaptobenzothiazole modified graphene oxide anti-corrosion coating, wherein the raw materials of which comprises, by mass ratio:

| | |
|---|---|
| 2-mercaptobenzothiazole modified graphene oxide | 5-20 parts |
| matrix resin | 30-70 parts |
| leveling agent | 0.5-1.0 parts |
| defoamant | 0.5-1.0 parts |
| dispersant | 0.5-1.0 parts |
| film-forming additive | 0.5-1.0 parts |
| diluent | 20-35 parts, | wherein the 2-mercaptobenzothiazole modified graphene oxide is synthesized from graphene oxide, cyanuric chloride, and 2-mercaptobenzothiazole.

3. The 2-mercaptobenzothiazole modified graphene oxide anti-corrosion coating according to claim 2, wherein the matrix resin is selected from at least one of epoxy resin, fluorocarbon resin, amino resin, acrylic resin, polyurethane resin, alkyd resin and polyester resin.

4. The 2-mercaptobenzothiazole modified graphene oxide anti-corrosion coating according to claim 2, wherein the leveling agent is selected from one of organosilicon, acrylic acid and monobutyl ether.

5. The 2-mercaptobenzothiazole modified graphene oxide anti-corrosion coating according to claim 2, wherein the defoamant is selected from one of organosilicon defoamants, inorganic silicon defoamants and non-orgranosilicon defoamants.

6. The 2-mercaptobenzothiazole modified graphene oxide anti-corrosion coating according to claim 2, wherein the dispersant is a self-fluxing dispersant or wetting dispersant.

7. The 2-mercaptobenzothiazole modified graphene oxide anti-corrosion coating according to claim 2, wherein the film-forming additive is selected from one of butyl benzyl alcohol acetate, ethylene glycol butyl ether glycolic acid ester, ethylene glycol phenyl ether, dibasic acid dimethyl esters, propylene glycol propyl ether and dibasic acid diethyl ester.

8. The 2-mercaptobenzothiazole modified graphene oxide anti-corrosion coating according to claim 2, wherein the diluent is selected from one of 1,4-butanediol diglycidyl ether, ethylene glycol diglycidyl ether, acetone, xylene, n-butanol and methyl isobutyl ketone, absolute ethanol, ethyl acetate, butyl acetate.

* * * * *